US011987950B2

(12) United States Patent
Hall et al.

(10) Patent No.: US 11,987,950 B2
(45) Date of Patent: May 21, 2024

(54) METHOD AND APPARATUS TO FORM RIP LINES ACROSS A SLOPING SURFACE

(71) Applicant: OPTI-MINEZ PTY LTD, Brisbane (AU)

(72) Inventors: David Hall, Brisbane (AU); Lachlan Yeldham, Brisbane (AU)

(73) Assignee: OPTI-MINEZ PTY LTD., Queensland (AU)

( * ) Notice: Subject to any disclaimer, the term of this patent is extended or adjusted under 35 U.S.C. 154(b) by 594 days.

(21) Appl. No.: 17/262,601

(22) PCT Filed: Jul. 25, 2019

(86) PCT No.: PCT/AU2019/050783
§ 371 (c)(1),
(2) Date: Jan. 22, 2021

(87) PCT Pub. No.: WO2020/019035
PCT Pub. Date: Jan. 30, 2020

(65) Prior Publication Data
US 2021/0355654 A1    Nov. 18, 2021

(30) Foreign Application Priority Data

Jul. 25, 2018   (AU) .................. 2018902689

(51) Int. Cl.
*E02F 5/32*       (2006.01)
*E02F 3/76*       (2006.01)
(Continued)

(52) U.S. Cl.
CPC .............. *E02F 5/32* (2013.01); *E02F 3/7604* (2013.01); *E02F 3/84* (2013.01); *E02F 3/841* (2013.01); *E02F 9/262* (2013.01); *A01B 13/16* (2013.01)

(58) Field of Classification Search
CPC . E02F 3/841; E02F 3/7604; E02F 5/32; E02F 9/262; E02F 3/84; A01B 13/16
See application file for complete search history.

(56) References Cited

U.S. PATENT DOCUMENTS 2,689,514 A * 9/1954 Ferguson ............. A01B 69/004
                                                    172/449
5,025,866 A * 6/1991 Schmidt et al. ..... A01B 69/004
                                                    180/401

(Continued)

FOREIGN PATENT DOCUMENTS

GB        929541 A    6/1963

OTHER PUBLICATIONS

'Revegetating Landfills and Waste Containment Areas Fact Sheet,' Dated Oct. 2006 on p. 12, The United States Environmental Protection Agency (EPA), <https://www.epa.gov/sites/default/files/2015-08/documents/revegetating_fact_sheet.pdf>, Retrieved on Sep. 23, 2023.*

(Continued)

*Primary Examiner* — Thomas B Will
*Assistant Examiner* — Joel F. Mitchell
(74) *Attorney, Agent, or Firm* — Wegman Hessler Valore

(57) ABSTRACT

A method and apparatus of forming two or more waving rip lines across a sloping surface, wherein the rip lines are formed at substantially right angles to the downward direction of the sloping surface and have a plurality of peaks and troughs. The troughs form catchment areas for water and the peaks separate the troughs limiting the amount of water stored in the catchment areas. Each of the rip lines can be substantially parallel with each other or offset relative to an adjacent rip line. The plurality of waving rip lines contribute to the stability of the landform, long term conservation and maintenance of the landform, and thereby encourage estab- (Continued)

lishment and growth of vegetation in the remediation process.

15 Claims, 12 Drawing Sheets

(51) Int. Cl.
*E02F 3/84* (2006.01)
*E02F 9/26* (2006.01)
*A01B 13/16* (2006.01)

(56) References Cited

U.S. PATENT DOCUMENTS

| | | | |
|---|---|---|---|
| 5,511,499 A | 4/1996 | Edinger | |
| 6,336,066 B1* | 1/2002 | Pellenc et al. | A01B 79/005 172/6 |
| 7,054,731 B1* | 5/2006 | Lange et al. | A01B 69/008 701/50 |
| 7,437,230 B2* | 10/2008 | McClure et al. | G05D 1/027 701/50 |
| 7,490,678 B2* | 2/2009 | Unruh et al. | A01B 69/004 172/3 |
| 8,256,526 B2* | 9/2012 | Schmidt et al. | A01B 69/004 172/449 |
| 8,275,627 B2* | 9/2012 | Henning et al. | A01C 21/002 111/164 |
| 8,622,008 B2* | 1/2014 | Henning et al. | A01C 5/064 111/164 |
| 2016/0128274 A1 | 5/2016 | Brindyuk | |

OTHER PUBLICATIONS

Written Opinion issued in International Application No. PCT/AU2019/050783 dated Jun. 24, 2020; 5 pages.
Ploughing along contour lines [retrieved from the Internet on Oct. 25, 2019] <URL: http://waterchain.eu/wp-content/uploads/2018/05/Ploughing-along-contour-lines.pdf > Published sources dated 2012 and Mar. 2018.
International Search Report and Written Opinion of International Application No. PCT/AU2019/050783 dated Nov. 1, 2019, 13 pages.
EquipmentWorld. "How to set up and operate a bulldozer using GPS blade control", [Video], YouTube, uploaded by EquipmentWorld, Aug. 9, 2016, https://www.youtube.com/watch?v=JKIqorMgKo0, 3 pages.

* cited by examiner

METHOD AND APPARATUS TO FORM RIP LINES ACROSS A SLOPING SURFACE

CROSS REFERENCE TO RELATED APPLICATIONS

This application is a national phase of International Patent Application No. PCT/AU2019/050783 filed Jul. 25, 2019, which claims the priority filing benefit of Australian Patent Application No. 2018902689 filed Jul. 25, 2018, which are incorporated herein by reference in their entirety.

FIELD OF INVENTION

The present invention relates to remediation of mining sites. The invention also relates to methods and apparatus for preventing or limiting soil erosion. The present invention has particular but not exclusive application for remediating an area where there has been an accumulation of mining waste or an excavated soil dump. The invention particularly applies but not limited to use in forming rip lines across a sloping land surface of a mining waste dump. The invention will be described in the specification with reference to the remediation of waste dumps. The reference to the remediation of waste dumps is by way of example only and the invention is not limited to this example. The invention can also apply to different areas of agriculture and farming, and land-care and development projects where erosion is an important consideration.

BACKGROUND OF THE INVENTION

During an open cut mining operation, rock waste is excavated from the mining pit and deposited at a waste dump. The rock waste accumulates over time at the waste dump and builds to become a raised landform. The waste dump continues to build until the mining management decides to remediate the area to the prescribed standard. The standard may vary but in most cases it involves spreading a layer of top soil over the area and the planting of appropriate vegetation to assist the waste dump to become a stable landform.

During remediation, dozers are used to reshape the waste dump into a hill or mound with a downward slope having a predetermined gradient that is not too steep. The gradient of the slope will vary with different rock types where comparatively harder packed rock can be maintained at a steeper gradient.

Following the reshaping of the waste dump to form a stable landform, top soil is then spread across the waste dump surface. Dozers with multiple tines are then used to key-in the top soil to the waste material below. The tines positioned at the rear of the dozer forms furrows as the dozer drives across the slope of the waste dump. The formed furrows are termed rip lines. Rip lines are formed about the slope of the landform at substantially right angles to the downward slope. As a consequence, multiple substantially parallel and straight rip lines are introduced across the slope of the surface of the waste dump. The rip lines form a constant zero grade so that water cannot flow directly downhill and erode the surface of the waste dump.

However, a problem with ripping across a slope is that if water finds a low spot it will run towards that spot and overflow the first rip line and then downhill to the next rip line. As rip lines are established with a constant zero grade, a large amount of water can be stored within the rip line as its catchment area can be the total area above the rip line. With a low spot, a large volume of stored water can overflow the rip line at the low spot and consequently cause erosion of the immediate area. Further, if the next rip line can not contain the flow, it will breach the second rip line releasing the total volume of water stored in that rip line which is combined with the volume of water from the first rip line. The problem will continue down the slope where the volume of water increases with each rip line until it reaches the ground level where it will find its way into the natural water courses.

Low spots in rip lines do occur as a consequence of ripping through surfaces that contain a heterogeneous mix of waste materials and the jump or deflection of the tine encountering the different materials. For example, if the tine hits a rock and consequently deviates from its path, it may inadvertently form a low spot in the rip line.

With time and exposure to the weather, a downhill water course is formed by erosion as the rip lines are breached and eroded at the low spot. The erosion of the landform destabilizes the landform and causes problems with the remediation of the waste dump.

OBJECT OF THE INVENTION

It is an object of the present invention to address the problem of erosion of a remediated waste dump by providing an alternate method and apparatus that overcomes at least in part one or more of the abovementioned problems.

SUMMARY OF THE INVENTION

In one aspect the present invention broadly resides in a method of forming two or more waving rip lines across a sloping surface. The rip lines are preferably formed at substantially right angles to the downward direction of the sloping surface.

The waving rip lines preferably have alternating peaks and troughs and have a wavelength defined by the distance between the adjacent peaks. The distance between the top of the peak and bottom of the trough is the amplitude and the amplitude defines the catchment area. Preferably rainwater is stored in the troughs between the peaks so that each trough forms a separate catchment area and the rip line consists of a plurality of trough catchment areas. Each of these catchment areas are preferably smaller than the catchment area when the rip line is substantially straight. In this way when water breaches a trough, only the water in that particular trough catchment area can overflow down to the next rip line.

The determination of wavelength and amplitude for any surface will depend on the gradient of the sloping surface and type of material of the sloping surface. Preferably the wavelength and amplitude of the waving rip line on a particular surface is determined in light of the gradient of the sloping surface and type of material on the sloping surface.

Preferably in one embodiment, the waving rip lines are substantially parallel or in phase with each other. In another preferred embodiment, the waving rip lines are offset or out of phase relative to each other. The waving rip lines can be partly offset or slightly out of phase relative to each other. The waving rip lines can be partly offset or slightly out of phase relative to each other in a manner so as to divert water in a preferred direction.

In a more preferred embodiment the waving rip lines are 180° out of phase relative to an adjacent rip line. The method in one embodiment forms rip lines that are offset relative to an adjacent rip line where a trough of a first rip line is aligned with a peak of an adjacent second rip line.

In another preferred embodiment the waving rip lines are 180° out of phase relative to each other and the top of each peak is substantially flat to divert water to troughs on either side of the flat peak.

Preferably the wavelength and amplitude of the waving rip line are substantially constant along each rip line. Where the sloping surface has a transverse curve (concave or convex), the wavelength and or the amplitude of the waving rip line can change to accommodate the topology of the surface. When the sloping surface is concave or convex in a direction that is substantially at right angles to the direction of the slope, the wavelength and or amplitude will preferably be comparatively shorter and smaller respectively to accommodate the topology change. Preferably the wavelength becomes shorter and or the amplitude becomes smaller when there is a transverse concave or convex shape to the slope. In a preferred embodiment the length of the wavelength is relatively shorter and or the amplitude is relatively smaller when the sloping surface is concave or convex in a direction that is substantially at right angles to the direction of the slope.

More preferably there is a proportional relationship between the transverse concave or convex shape of the slope and the wavelength length and or amplitude height. Other factors affecting the wavelength and amplitude include material composition of the waste dump, the presence of benches and capping, and where the slope has two or more different gradients.

The peak between the troughs in a rip line can be any suitable shape including rounded, pointed, unsymmetrical, and flat. The flat and unsymmetrical shaped peak can be used to preferably divert most or all of the water to one of the adjacent troughs.

The troughs of a rip line can have different shapes to provide a catchment area to hold different volumes of water. In one embodiment, a first trough that is comparatively wider and shallower than a second trough can hold more water without having a single low point where the water can overflow.

The spacing between rip lines can vary depending on the type of material in the waste dump and the steepness of the waste dump.

The invention in a broad aspect is a method of forming two or more waving rip lines across a sloping surface, wherein the rip lines are formed at substantially right angles to the downward direction of the sloping surface and have a plurality of peaks and troughs, said troughs form catchment areas for water and the peaks separate the troughs limiting the amount of water stored in the catchment areas; each of said rip lines can be substantially parallel with each other or offset relative to an adjacent rip line.

The method is used to form wavy rip lines across the surface of an earth waste dump.

In another aspect the invention is a remediation process to restore an earth waste dump using the method as described above.

In a further aspect the invention is a stable landform that is formed using the method as described above.

In another aspect the invention broadly resides in an apparatus to form rip lines across a sloping surface, including two or more tines spaced apart from each other;
linkage arrangement to move the tines laterally relative to the forward operational direction of the apparatus;

control system to actuate the linkage arrangement in accordance with programmed instructions and position information; wherein during operation the tines move laterally in a predetermined manner to form waving rip lines across the sloping surface.

Preferably there are separate linkage arrangement operationally associated with each of the tines.

The control system can include one or more GPS antennas and a controller which receives and processes input from the one or more GPS antennas including position, velocity and directional heading.

The controller can receive and process instructions from programed maps and directions. Alternatively, the controller can receive and process input from previously generated information and data regarding rip spacing parameters.

The waving rip lines can be in phase or out of phase relative to each other as described above.

The apparatus is preferably an attachment for a dozer, excavator, tractor or other similar vehicle.

The features described with respect to one aspect also apply where applicable to all other aspects of the invention. Furthermore different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENTS

The preferred embodiments of the invention are described with reference to FIGS. 1 to 12. The preferred embodiments of the invention are described with respect to remediation of a waste dump where waste rock has been deposited in an area as a result of the excavation of an open cut mine. The reference to the remediation of a waste dump is an example of the application of the invention and the invention is not limited to this example and preferred embodiment.

Figure 1:
FIG. 1 is a photograph of a reshaped waste dump with parallel straight rip lines made about the area.

A waste dump is formed by the depositing of soil and rock from another site. The volume of waste deposited is often large and changes the landscape to form a new landform. When there is a decision to stop depositing waste in the waste dump, the waste dump is reshaped and remediated so that it forms a stable landform. An example of the reshaping of a waste dump is shown in FIG. 1. In FIG. 1, dozers are used to reshape the landform so that there is a slope from the top to the bottom of the landform having a gradient where the rock and soil remains stably in place. The gradient cannot be too steep otherwise rocks and other matter would be likely to fall downhill. To flatten a gradient, a great deal of effort and resources are required and any unnecessary redistribution of waste adds to the expense of the remediation process.

Following reshaping of the waste dump, top soil is added to cover the surface. The depth of top soil will depend on the gradient of the slope of the reshaped landform, type of the waste material and the type of vegetation to be planted on the landform. Preferably plants that are native to the area are used in the remediation process.

Prior to planting the vegetation, the soil is keyed-in with the waste material by introducing a series of rip lines (furrows) across the slope of the landform. The rip lines of the prior art are straight and substantially parallel to each other. This is shown in FIG. 1 where there is a series of rip lines 10 spaced apart by embankments 11.

Figure 2:
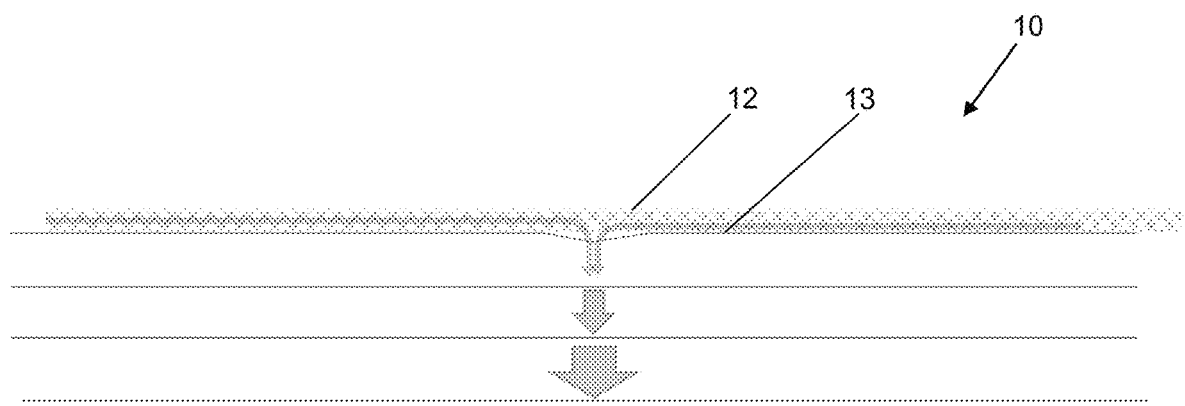
FIG. 2 is a diagrammatic view of how water overflows parallel straight rip lines across the slope of a remediated area.
Figure 12:
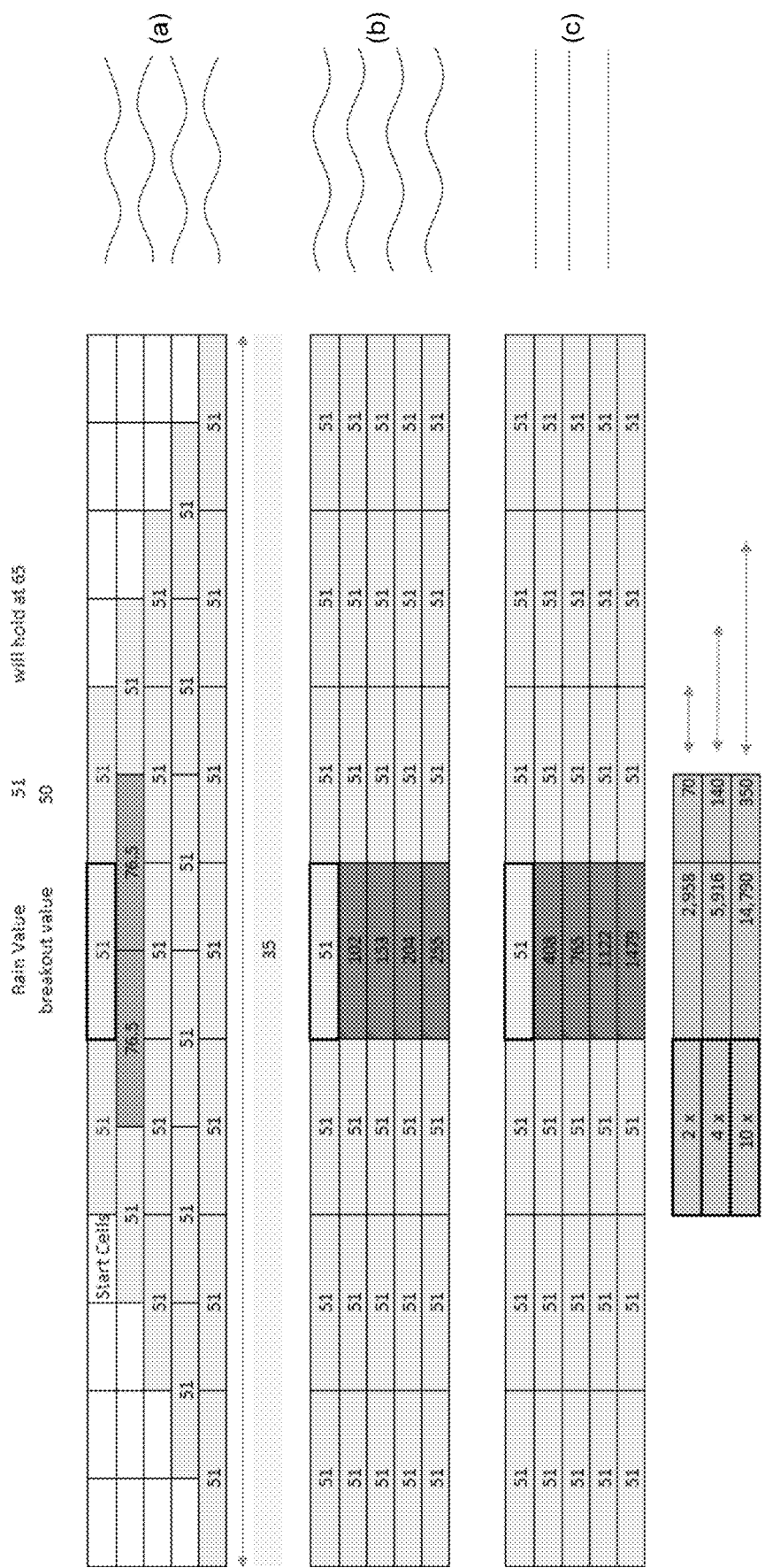
FIG. 12 is a diagram showing the volume of water in liters when the water overflows the rip lines when the rip lines are (a) waving and 180° out of phase, (b) waving and parallel, and (c) straight and parallel.

Each of the rip lines 10 have a constant zero grade so that rain water accumulates in the catchment area 12 immediately behind the entire rip line wall 13. In this way, the rip line wall 13 acts like a dam wall holding a reservoir of water. Where there is a low point in the rip line wall 13, the water accumulating in the catchment area 12 can overflow the rip line wall 13 and add additional water to the next rip line. If the accumulating water breaches the next rip line, then water from two rip lines flows to the third rip line. FIG. 2 diagrammatically shows how water can breach a first rip line and flow to the next rip line and consequently dramatically increasing the amount of water in the catchment area of the next rip line. As a consequence, the volume of water increases as each rip line is breached and the corresponding degree of erosion correspondingly increases. FIG. 12 part C shows in a numerical form how the volume of water increases as water passes from one rip line to the next. In the example set out in FIG. 12, the amount of water held in each segment is 51 litres. In this example only 7 segments are considered. If there is a low spot in one of the segments, all the water in the 7 segments overflows to the next rip line. The volume of water flowing into the segment in the next rip line (and including the 51 litres of water already in the segment) will be 408 litres. If this volume then overflows to the next rip line, the segment in the next rip line will have 765 litres. The volume of water exponentially increases as it flows to subsequent rip lines.

The current invention addresses this problem by introducing waving rip lines. There are three different embodiments described in the current invention. The spacing between rip lines can vary depending on the type of material in the waste dump and the steepness of the reshaped waste dump.

Figure 3:
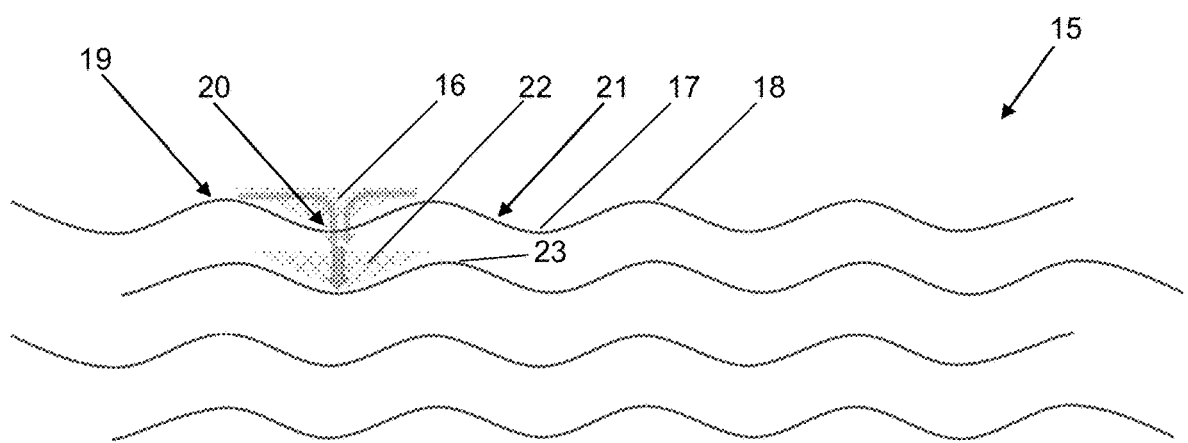
FIG. 3 is a diagrammatic view of how water overflows parallel waving rip lines across the slope of a remediated area.
Figure 7:
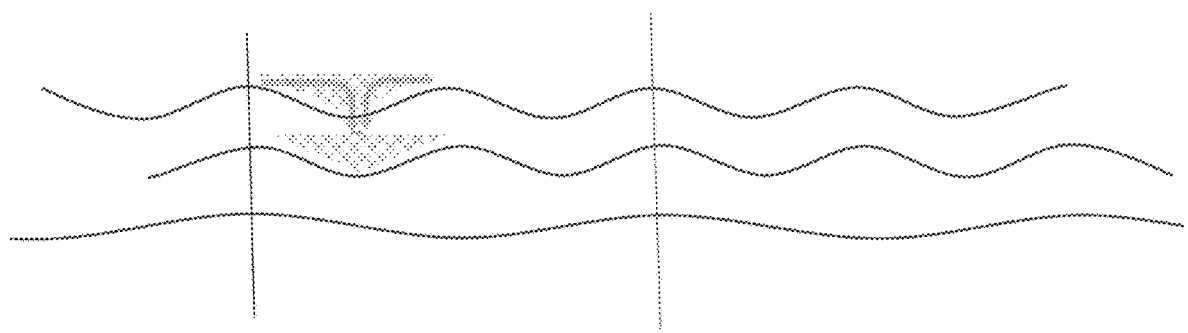
FIG. 7 is a diagrammatic view of how water overflows waving rip lines where the amplitude and wavelength changes across the slope of a remediated area in response to change in shape of the slope surface.

The first embodiment is diagrammatically shown in FIG. 3 where there are a plurality of substantially parallel waving rip lines 15. In the first embodiment the catchment area 16 of the rip line 17 is separated into a series of segments spaced apart by peaks 18. The catchment areas 16 are troughs formed between adjacent peaks 18. The distance between the two adjacent peaks 18 forms the wave length. The wave length can vary depending on the slope and the landform features. If the slope has a transverse curvature, the wave length can be shortened to ensure the rip line is functional. The distance between the top of the peak 19 and the trough bottom 20 is the amplitude. The amplitude can also vary depending on the topology of the slope and landform. FIG. 7 shows rip lines having different wave lengths and amplitude as a result of a convex or concave curvature across a transverse section of the slope.

In the first embodiment where there are substantially parallel waving rip lines, rain water accumulates in each of the separated catchment areas 16. If the water from one of the catchment areas 16 breaches the rip line wall 21, only the water held in that particular catchment area 16 flows to the adjacent downhill catchment area 22 of the second rip line 23. With the catchment areas being segmented, only a limited volume of water passes to the next rip line. Consequently, erosion of the slope surface is reduced and limited providing a more stable landform. The effect of water passing from one rip line to the next is shown in FIG. 12 part B.

Figure 4:
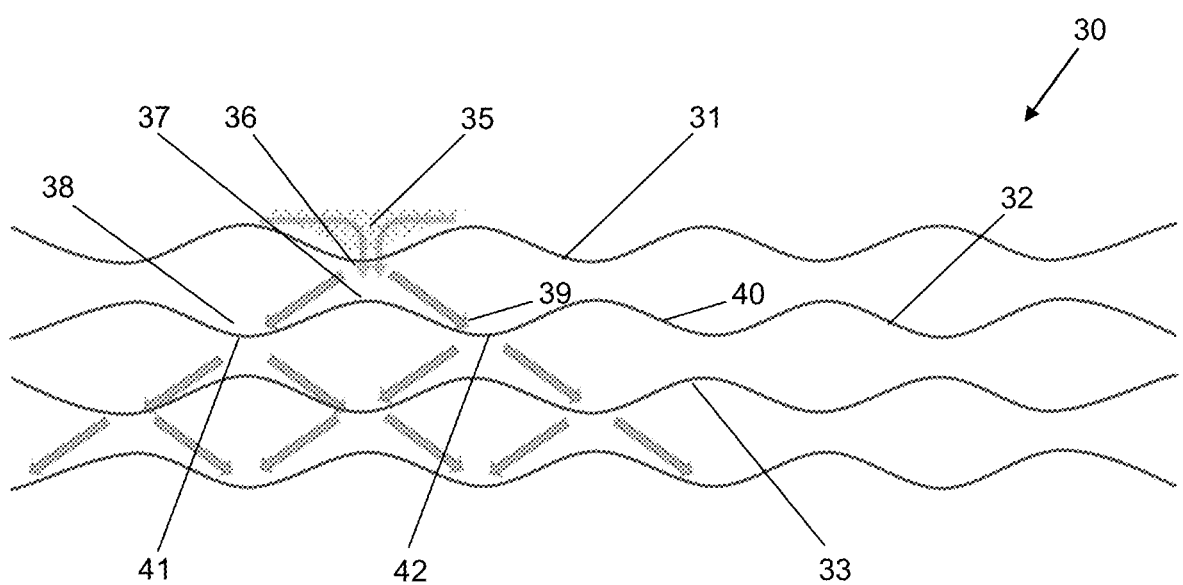
FIG. 4 is a diagrammatic view of how water overflows waving rip lines 180° out of phase across the slope of a remediated area.

A second preferred embodiment of a waving rip line that is 180° out of phase with an adjacent rip line is shown in FIG. 4. In this figure, there is shown a plurality of waving rip lines 30. In this preferred embodiment, the second rip line 32 is 180° out of phase with the first rip line 31. The third rip line 33 is 180° out of phase with the second rip line 32 but substantially parallel with the first rip line 31. In this preferred embodiment the catchment areas 35 are separated and segmented like in the first preferred embodiment. Rain water accumulating in the catchment area 35 of the first rip line 31 can overflow the rip line wall 36 and be diverted to either side of the adjacent peak 37 in the second rip line 32. Rain water is then spread to the catchment areas 38 and 39 either side of the peak 37. If the rip line wall 40 is breached at 41 and/or 42, the process is repeated where water is again diverted by the presence of a peak. In this situation, a smaller volume of water flows to each of the catchment areas in the second rip line. The effect of the accumulation of rain water and overflow in the second embodiment is numerical shown in FIG. 12 part A.

Figure 5A:
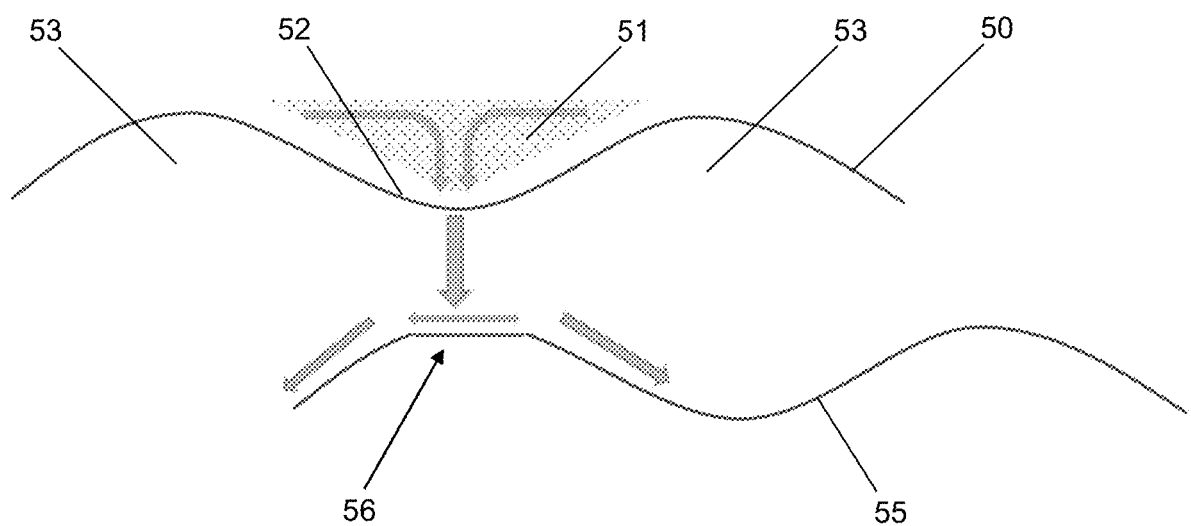
FIGS. 5a and 5b are a diagrammatic views of alternate embodiments of how water overflows waving rip lines 180° out of phase and where the peaks are flattened.

An alternate preferred second embodiment is shown in FIG. 5a. In this embodiment there is a first waving rip line 50 with a catchment area 51 in the trough 52 between adjacent peaks 53. In the second rip line 55, there is a flattened peak 56 that is adjacent to catchment area 51. The flattened portion 56 serves to divert water to the adjacent catchment areas in the second rip line 55. In this embodiment the peak is flattened, however the peak can be shaped to divert water towards one side or the other.

Figure 5B:
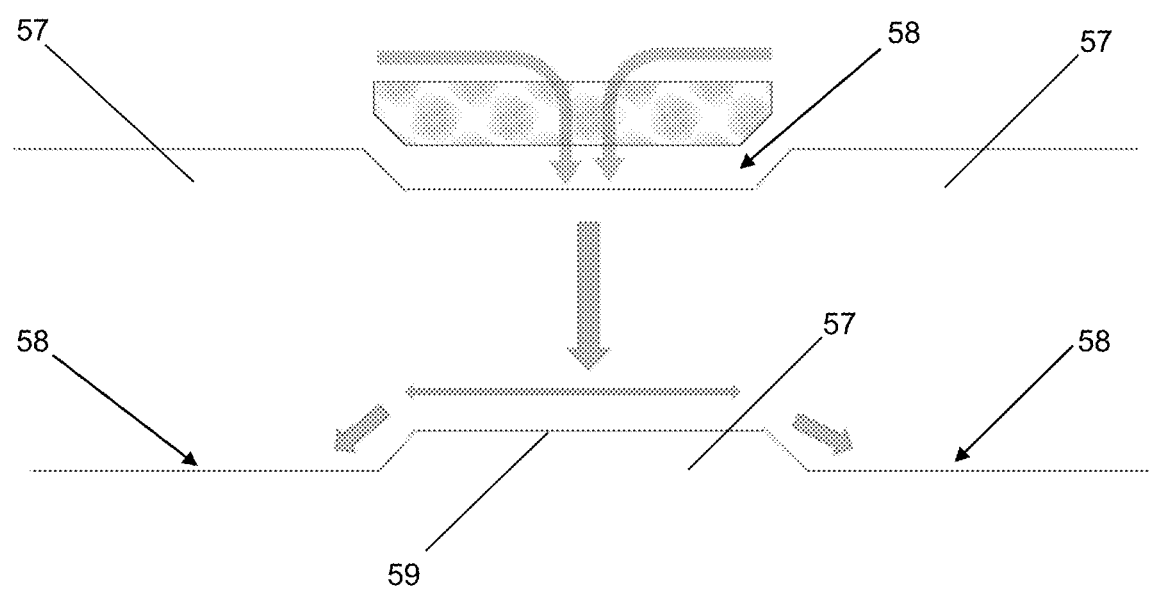

A further alternate second embodiment is shown in FIG. 5b. In this embodiment, the peaks 57 are flattened and the troughs 58 are substantially flat rather than concave. The substantially flat trough 58 provides a catchment area that can comparatively hold more water than a concave-shaped trough. As with the second embodiment shown in FIG. 5a, water can be diverted to either side of the flat surface 59 of the flattened peak 57.

Figure 6:
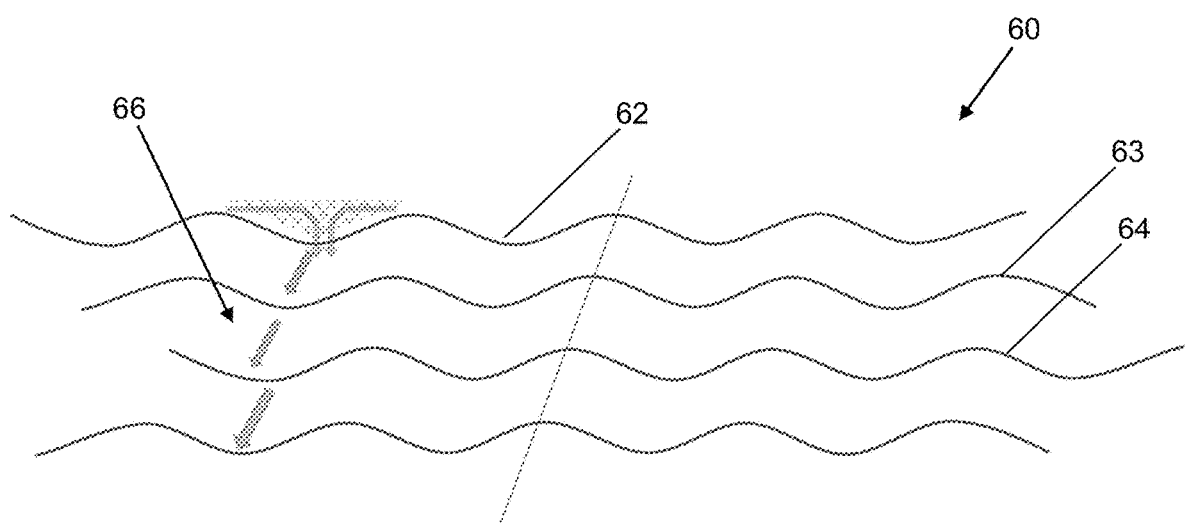
FIG. 6 is a diagrammatic view of how water overflows waving rip lines that are out of phase across the slope of a remediated area.

In a third preferred embodiment shown in FIG. 6, the waving rip lines 60 are slightly out of phase with each other. An example of the third embodiment is shown in FIG. 6 where the first waving rip line 62 is offset relative to the second waving rip line 63 and third waving rip line 64. The second waving rip line 63 is also offset with respect to the third waving rip line 64. The degree of offset or out of phase can vary between embodiments. Where there is a continuous offset in subsequent rip lines as is shown in FIG. 6, water that overflows the rip lines will be directed at an angle across the slope as the water travels downhill. This is shown diagrammatically at 66 in FIG. 6. With having a continuous offset in the waving rip lines of subsequent rip lines, it is possible to control the direction of waterflow to best suit the landform and direct the water to natural water courses at the bottom of the landform.

Figure 8A:
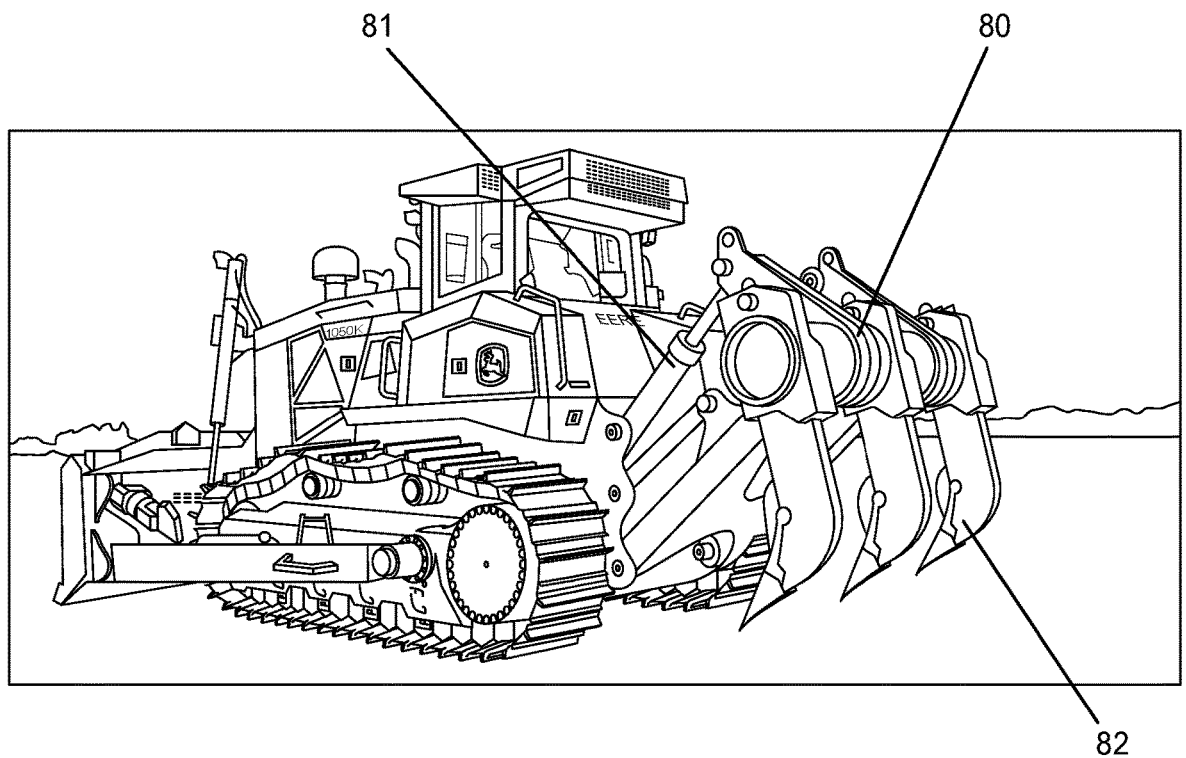
FIG. 8a is a photograph of a dozer with a conventional rear tine attachment and FIG. 8b is a diagrammatic side view of a portion of the conventional tines attachment.
Figure 8B:
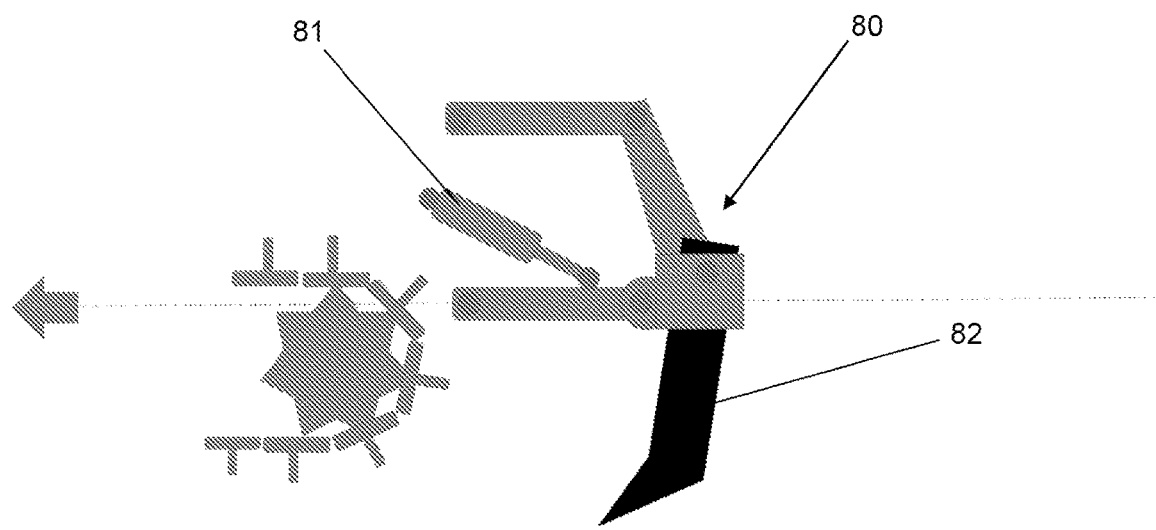

Rip lines are currently formed by a dozer attachment that has multiple tines extending therefrom. An example of the current dozer attachment 80 is shown in FIG. 8a and diagrammatically represented in FIG. 8b. The attachment 80 is raised and lowered using rams 81. There are a series of tines 82 that when the attachment 80 is lowered produce substantially parallel furrows or rip lines across the surface.

With the current invention there is a dozer attachment with separate controls for each tine. The preferred embodiment of the dozer attachment that can form the waving rip lines is shown in FIGS. 9, 10 and 11.

Figure 9:
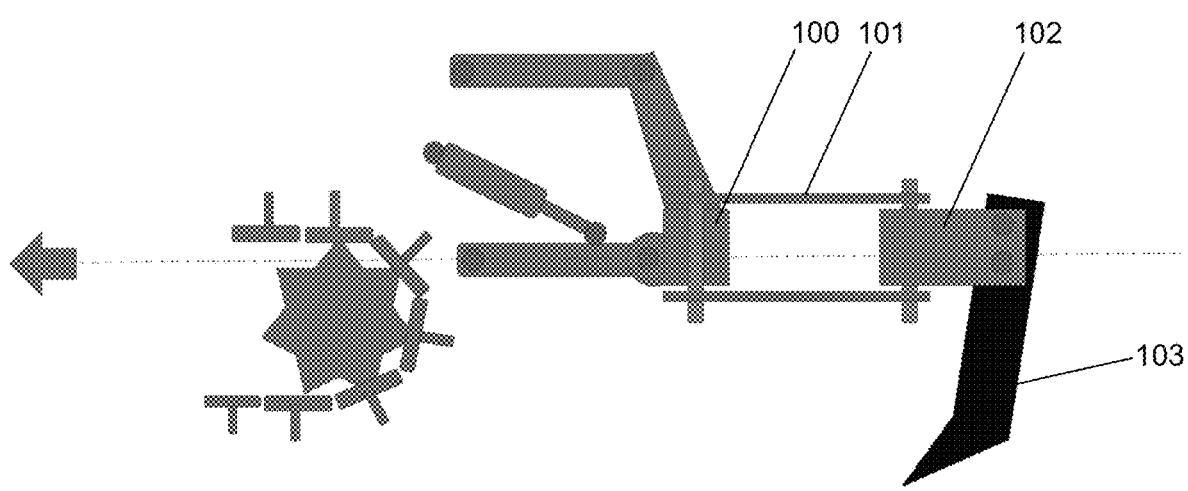
FIG. 9 is a diagrammatic side view of a portion of the tines attachment of the of a preferred embodiment of the present invention.

In FIG. 9, there is shown part of the attachment of the present invention, including a support 100, linkage arm 101 and tine arm 102

Figure 10:
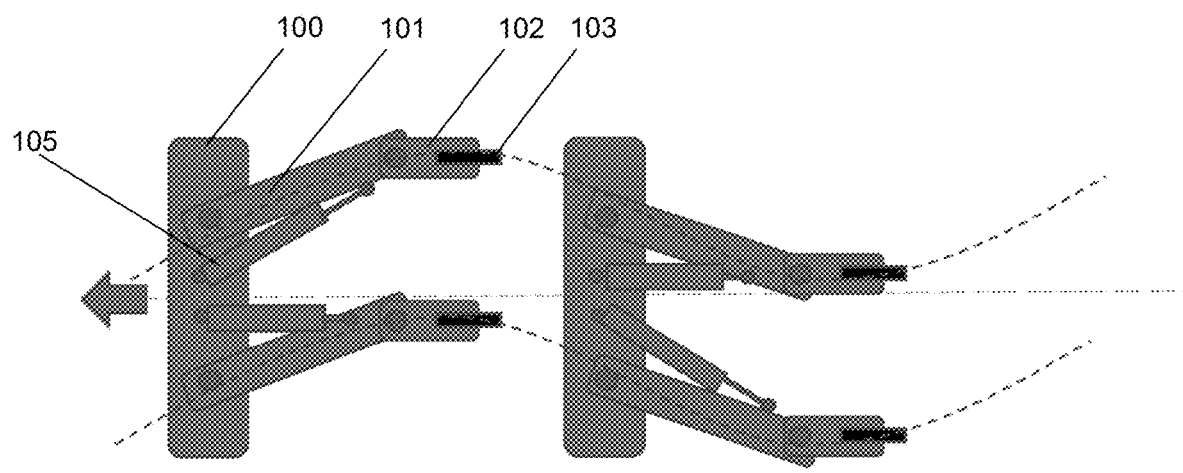
FIG. 10 is a diagrammatic view of a tines attachment of the present invention where parallel waving rip lines are made.
Figure 11:
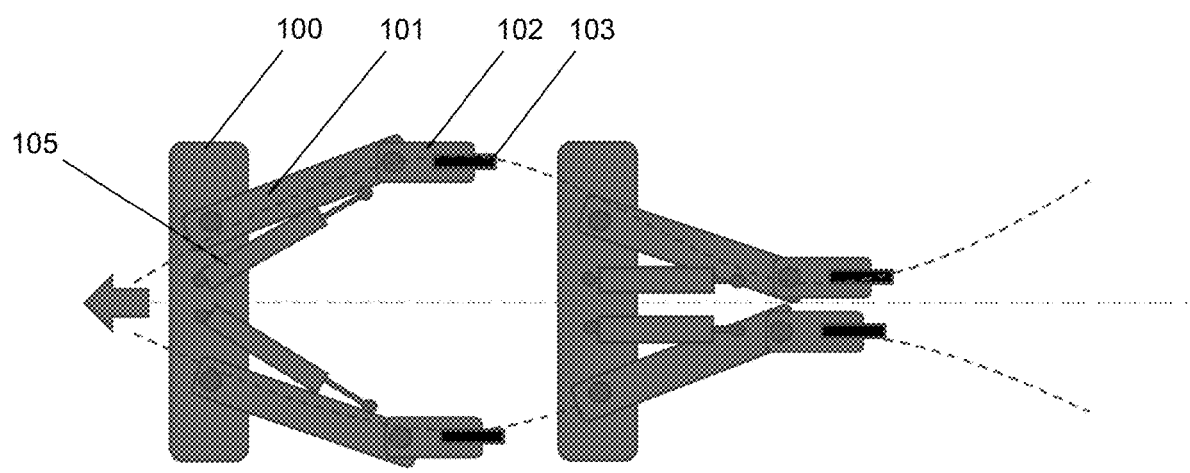
FIG. 11 is a diagrammatic view of a tines attachment of the present invention where waving rip lines are made which are 180° out of phase.

In FIG. 10, the waving rip lines are formed substantially parallel to each other whereas in FIG. 11, the waving rip lines are formed 180° out of phase with respect to each other. The dozer attachment shown in FIGS. 10 and 11 are substantially the same except for the position of the tines relative to each other.

The attachment shown in FIG. 10 includes support 100, linkage arm 101, tine arm 102 and tine 103. The ram 105 is attached to the support 100 and linkage arm 101. The position of the linkage arm 101 relative to the support is controlled by the ram 105. The linkage arm 101 is pivotally attached to the support 100. The tine arm 102 is pivotally attached to the linkage arm 101. The tine 103 is fixed to the tine arm 102. The position of the tine arm 102 and tine 103 is substantially controlled by the forward movement of the attachment and lateral positioning by the ram 105. When the dozer (and hence attachment) moves forward, the tine arm 102 and tine 103 are positioned to be substantially at right angles to the longitudinal axis of the support 100. The tine 103 can jump or deviate as a result of hitting a rock or the like.

In an alternate embodiment a tine ram can be used to control the position of the tine and connected to the linkage arm 101 and tine arm 102.

There is a programmable controller (not shown) that changes the position of the tines 103 by actuating the rams 105. The programmable controller can be pre-programmed to produce waving rip lines of different wave lengths and amplitude and make the waving rip lines substantially parallel to each other, 180° out of phase relative to each other or offset relative to each other. The programmable controller can also have a set of rules as to what waving rip line formations should be formed in light of different parameters. The programmable controller can also receive and process GPS data and other inputs to form the most suitable waving rip line formations for a particular landform.

ADVANTAGES

The advantages of the preferred embodiments of the present invention include forming a plurality of waving rip lines which contribute to the stability of the landform, long term conservation and maintenance of the landform, and thereby encourage establishment and growth of vegetation in the remediation process. With the apparatus of the preferred embodiment and the formation of waving rip lines, the remediated landform is subjected to less erosion and degradation then with the use of substantially straight and parallel rip lines. Where there is less erosion and degradation of the remediated landform when using the preferred embodiments of the method and apparatus of the present invention, there is an economic benefit (cost saving) in producing and maintaining the remediated landform.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. An apparatus to form rip lines across a sloping surface, comprising two or more tines spaced apart from each other;
    a linkage arrangement to move the tines laterally relative to a forward operational direction of the apparatus; and
    a control system to actuate the linkage arrangement in accordance with programmed instructions and position information to form regular rip lines with a predetermined wavelength;
    wherein during operation the tines move laterally in a predetermined manner to form waving rip lines across the sloping surface;
    wherein a wavelength and an amplitude of the rip lines are determined by the sloping surface and associated topography and the material of the sloping surface.

2. The apparatus as claimed in claim 1, wherein the apparatus has a plurality of linkage arrangements, each linkage arrangement operationally associated with one of each of the tines.

3. The apparatus as claimed in claim 1, wherein the control system includes one or more GPS antennas and a controller which receives and processes input from the one or more GPS antennas including position, velocity and directional heading.

4. The apparatus as claimed in claim 3, wherein the controller can receive and process instructions from programed maps and directions.

5. An apparatus as claimed in claim 3, wherein the controller can receive and process input from previously generated information and data regarding rip spacing parameters.

6. The apparatus as claimed in claim 1, wherein the apparatus is an attachment for a dozer, excavator, tractor or other similar vehicle.

7. The apparatus as claimed in claim 1, wherein the rip lines are formed at right angles to a downward direction of the sloping surface and have a plurality of peaks and troughs, said troughs form catchment areas for water and the peaks separate the troughs limiting an amount of water stored in the catchment areas; each of said rip lines can be parallel with each other or offset relative to an adjacent rip line.

8. A method of forming two or more waving rip lines across a sloping surface comprising,
   providing an apparatus to form rip lines across a sloping surface, comprising
       two or more tines spaced apart from each other;
       a linkage arrangement to move the tines laterally relative to a forward operational direction of the apparatus; and
       a control system to actuate the linkage arrangement in accordance with programmed instructions and position information to form regular rip lines with a predetermined wavelength; wherein during operation the tines move laterally in a predetermined manner to form waving rip lines across the sloping surface; and
   forming the rip lines at right angles to a downward direction of the sloping surface and have a plurality of peaks and troughs, said troughs form catchment areas for water and the peaks separate the troughs limiting the amount of water stored in the catchment areas; each of said rip lines can be parallel with each other or offset relative to an adjacent rip line;
   wherein a wavelength and an amplitude of the rip lines are determined by the sloping surface and associated topography and the material of the sloping surface.

9. The method as claimed in claim 8, wherein the rip lines are formed across a surface of an earth waste dump.

10. The method as claimed in claim 8, wherein each of the rip lines are offset relative to an adjacent rip line so that water can be diverted to a preferred trough.

11. The method as claimed in claim 8, wherein each of the rip lines are offset relative to an adjacent rip line where a trough of a first rip line is aligned with a peak of an adjacent second rip line.

12. The method as claimed in claim 8, wherein one or more of the peaks are shaped unsymmetrically, pointed, round or flat to facilitate diverting of water, topography changes or accommodating differences in material.

13. The method as claimed in claim 8, wherein one or more troughs have a different shape to provide a catchment area that holds a different volume of water.

14. The method as claimed in claim 8, wherein a wavelength and amplitude of each of the rip lines are constant along each of the rip lines.

15. The method as claimed in claim 8, wherein a length of the wavelength is relatively shorter and or the amplitude is relatively smaller relative to the predetermined wavelength when the sloping surface is concave or convex in a direction that is at right angles to the direction of the slope.

* * * * *